(12) United States Patent
Huang et al.

(10) Patent No.: US 12,308,558 B2
(45) Date of Patent: May 20, 2025

(54) AUTOMOTIVE CONNECTOR

(71) Applicant: ADVANCED-CONNECTEK INC., New Taipei (TW)

(72) Inventors: Sheng-Hsiang Huang, New Taipei (TW); Yu-Feng Ke, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 399 days.

(21) Appl. No.: 18/078,619

(22) Filed: Dec. 9, 2022

(65) Prior Publication Data
US 2023/0187885 A1  Jun. 15, 2023

(30) Foreign Application Priority Data

Dec. 9, 2021 (TW) .................. 110214718

(51) Int. Cl.
| | |
|---|---|
| *H01R 13/514* | (2006.01) |
| *H01R 13/24* | (2006.01) |
| *H01R 13/516* | (2006.01) |
| *H01R 13/629* | (2006.01) |
| *H01R 24/64* | (2011.01) |
| *H01R 27/02* | (2006.01) |
| *H04L 12/10* | (2006.01) |

(52) U.S. Cl.
CPC ........... *H01R 13/514* (2013.01); *H01R 13/24* (2013.01); *H01R 13/516* (2013.01); *H01R 13/629* (2013.01); *H01R 24/64* (2013.01); *H01R 27/02* (2013.01); *H04L 12/10* (2013.01); *H01R 2201/26* (2013.01)

(58) Field of Classification Search
CPC .... H01R 13/514; H01R 13/24; H01R 13/516; H01R 13/629; H01R 24/64; H01R 27/02; H04L 12/10
USPC .............................. 439/541.5, 701, 686, 695
See application file for complete search history.

(56) References Cited

U.S. PATENT DOCUMENTS

| | | | | |
|---|---|---|---|---|
| 5,352,133 | A * | 10/1994 | Sampson | H01R 13/6271 439/701 |
| 6,955,568 | B1 * | 10/2005 | Wu | H01R 13/506 439/701 |
| 7,485,012 | B2 * | 2/2009 | Daugherty | H01R 13/514 439/701 |
| 8,876,537 | B2 * | 11/2014 | Katsuse | H01R 13/73 439/701 |
| 2002/0039862 | A1 * | 4/2002 | Nishide | H01R 13/6456 439/701 |
| 2006/0217003 | A1 * | 9/2006 | Martin | H01R 13/6271 439/701 |
| 2008/0280500 | A1 * | 11/2008 | Martich | H01R 27/00 211/26 |

* cited by examiner

*Primary Examiner* — Gary F Paumen
(74) *Attorney, Agent, or Firm* — MUNCY, GEISSLER, OLDS & LOWE. P.C.

(57) ABSTRACT

An automotive connector includes an outer shell, an inner shell mated with the outer shell, and a conductive assembly assembled in the inner shell. The hooks of the outer shell can be detached from the slots of the inner shell, so that the outer shell can be detached from the inner shell. Therefore, another outer shell can be assembled with the inner shell, so that outer shells with different insertion openings can be assembled with the same inner shell conveniently. Therefore, the outer shell of the automotive connector can be replaced quickly.

10 Claims, 8 Drawing Sheets

AUTOMOTIVE CONNECTOR

CROSS-REFERENCE TO RELATED APPLICATION

This non-provisional application claims priority under 35 U.S.C. § 119 (a) to patent application No. 110214718 in Taiwan, R.O.C. filed on Dec. 9, 2021, the entire contents of which are hereby incorporated by reference.

FIELD OF THE INVENTION

The instant disclosure relates to an electrical connector, and more particular to an automotive connector.

BACKGROUND

Electrical connectors are utilized in electronic products for power or signal transmissions, and electrical connectors are also widely utilized for the connection between communication devices. Moreover, electrical connectors are also widely utilized in the circuit system of cars and motorcycles for the connection between the circuits, so that the contact terminals in the electrical connector can be steadily positioned and fixed.

SUMMARY OF THE INVENTION

For an automotive connector known to the inventor, the assembling between the front shell and the rear shell of the connector is usually achieved by interference fitting or engaging between the shells. In the case that the front shell and the rear shell of the automotive connector are assembled with each other by the interference fitting manner, after the automotive connector is assembled on a circuit board and heated by the reflow oven, the components of the connector are deformed or the stress on the components is released, so that the interference portions between the shells are also deformed, thus reducing or offsetting the assembling force between the shells of the connector. As a result, the assembling functions of the shells are failed. In the case that the front shell and the rear shell of the automotive connector are assembled with each other by the engaging manner, after the engaging structures of the shells are engaged with each other, the shells cannot be detached from each other easily, so that the shell of the automotive connector cannot be replaced conveniently. As a result, the shell of the automotive connector cannot be replaced effectively for providing a mating connector with shells having different insertion openings. Moreover, the rear portion of the front shell has a protrusion, and the protrusion leans against an upper portion of the rear shell. Therefore, in this case, the front shell and the rear shell are assembled with each other through the contact and support of the protrusion. When the automotive connector is mated with another electrical connector, the front shell is pressed and pushed by the another electrical connector. As mentioned above, because the front shell and the rear shell are assembled with each other merely by the contact and support of the protrusion in a small-surface contact manner, the support of the protrusion is not sufficient. As a result, the front shell is wobbled with respect to the rear shell or vice versa, so that the structural stability of the automotive connector will be affected when the automotive connector is mated with another electrical connector.

In view of these, an embodiment of the instant disclosure provides an automotive connector comprising an outer shell, an inner shell, and a conductive assembly. The outer shell has a hollow receiving cavity. Two sides of the outer shell have an insertion opening and a mating opening respectively in communication with the hollow receiving cavity, the outer shell has a plurality of hooks, and each of the hooks extends outwardly from a contact surface at an outer side of the mating opening. The inner shell comprises a base and a sleeve member at a side portion of the base. The sleeve member is fixed in the hollow receiving cavity of the outer shell, the base has a mating surface and two slots at two sides of the mating surface, the mating surface is attached to the contact surface, and each of the hooks is engaged with a corresponding one of the slots. The conductive assembly comprises an insulated body and a plurality of conductive members. The insulated body is fitted over the conductive members, and the insulated body is in the base and the sleeve member.

In some embodiments, the base has a plurality of spaces and a plurality of openings. The openings and the slots are respectively at two sides of the base and are in communication with each other, each of the spaces is at the inner side of a corresponding one of the openings, and each of the hooks is movable in a corresponding one of the spaces, so that each of the hooks is movably engaged with or detached from the inner side of the corresponding one of the openings.

In some embodiments, an outer surface of the sleeve member has a plurality of abutting portions, and the abutting portions are engaged with an inner surface of the mating opening.

In some embodiments, the abutting portions are at two sides of the outer surface of the sleeve member, and an extension direction of each of the abutting portions is parallel to a central axial direction of the sleeve member.

In some embodiments, the abutting portions are at two sides of the outer surface of the sleeve member, and an extension direction of each of the abutting portions is parallel to a central axial direction of the sleeve member.

In some embodiments, the base has a recessed portion, and each of two sides of an inner portion of the recessed portion has a slide block and a limiting groove. The insulated body is fixed in the recessed portion. Each of two sides of an outer portion of the insulated body has a slide groove and a limiting block, each of the slide blocks corresponds to a corresponding one of the slide grooves, and each of the limiting blocks corresponds to a corresponding one of the limiting grooves.

In some embodiments, each of the two sides of the inner portion of the recessed portion has a stopping block, and each of the stopping blocks leans against a corresponding one of the limiting blocks.

In some embodiments, the insulated body has a connector head and a fixation mount, and the connector head extends outwardly from the fixation mount. The slide grooves and the limiting blocks are respectively at two sides of the fixation mount, the insulated body has a plurality of penetration holes defined through the connector head and the fixation mount, and the conductive members pass through the connector head and the fixation mount.

In some embodiments, an outer periphery of the connector head has a plurality of protruding ribs, the inner shell has a through hole, and the protruding ribs lean against an inner surface of the through hole.

In some embodiments, the hooks extend obliquely with respect to each other, so that a distance between head portions of the hooks is less than a distance between end portions of the hooks, and the distance between the end portions of the hooks is greater than a spacing between the slots.

As above, according to some embodiments of the instant disclosure, the hooks of the outer shell can be detached from the slots of the inner shell barehanded, so that the outer shell can be detached from the inner shell. Then, another outer shell can be assembled with the inner shell, so that outer shells with different insertion openings can be assembled with the same inner shell conveniently. Therefore, the outer shell of the automotive connector can be replaced quickly, and thus the inventory of the outer shells of the automotive connector can be reduced. Moreover, in some embodiments, because the assembling between the outer shell and the inner shell is achieved by configuring the mating surface to attach to and lean against the contact surface in a large-surface contact manner, the mating surface and the contact surface can be properly supported by each other. Therefore, when the automotive connector is mated with another electrical connector in an improper orientation, the outer shell and the inner shell do not wobble with respect to each other. Hence, the connection stability between the automotive connector and the another electrical connector is not affected.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
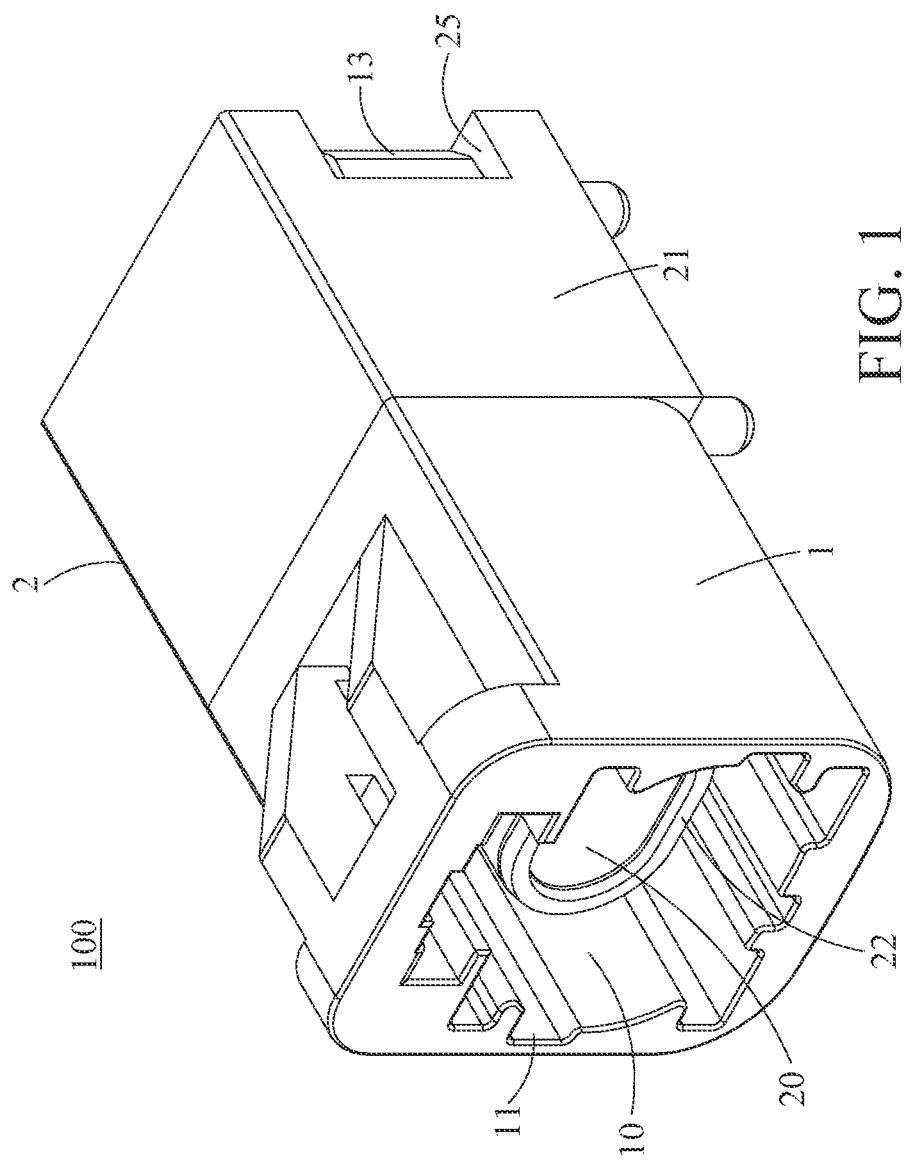
FIG. 1 illustrates a perspective view of an automotive connector according to some embodiments of the instant disclosure.
Figure 2A:
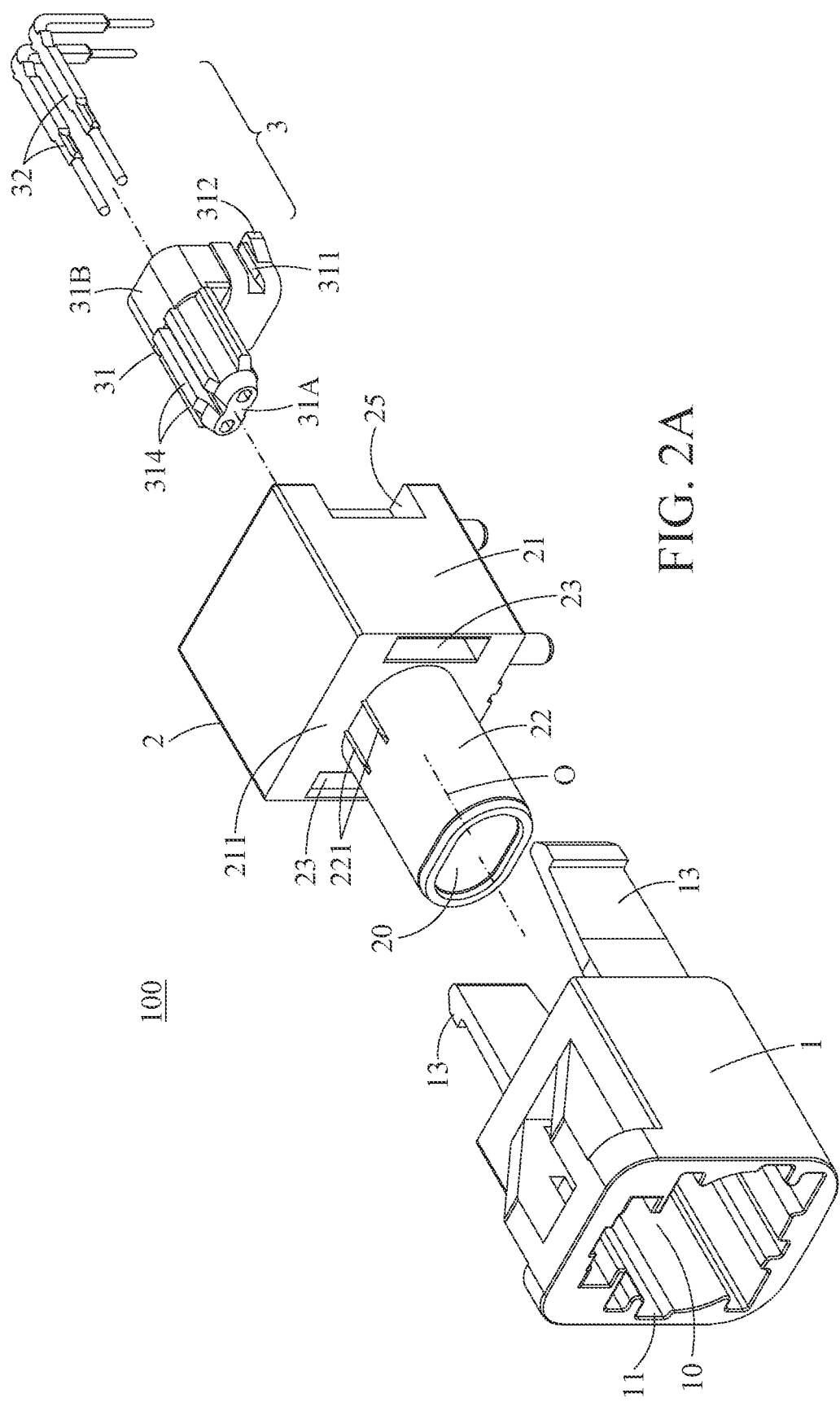
FIG. 2A illustrates a front exploded view of the automotive connector according to some embodiments of the instant disclosure, where the extension direction of each of the abutting portions of the inner shell is parallel to the central axial direction of the sleeve member.

Please refer to FIG. 1 and FIG. 2A. FIG. 1 illustrates a perspective view of an automotive connector 100 according to some embodiments of the instant disclosure. FIG. 2A illustrates a front exploded view of the automotive connector 100 according to some embodiments of the instant disclosure. In some embodiments, the automotive connector 100 is a plug connector and is served as the connector for automotive Ethernet connection. In this embodiment, the automotive connector 100 comprises an outer shell 1, an inner shell 2, and a conductive assembly 3.

Figure 3:
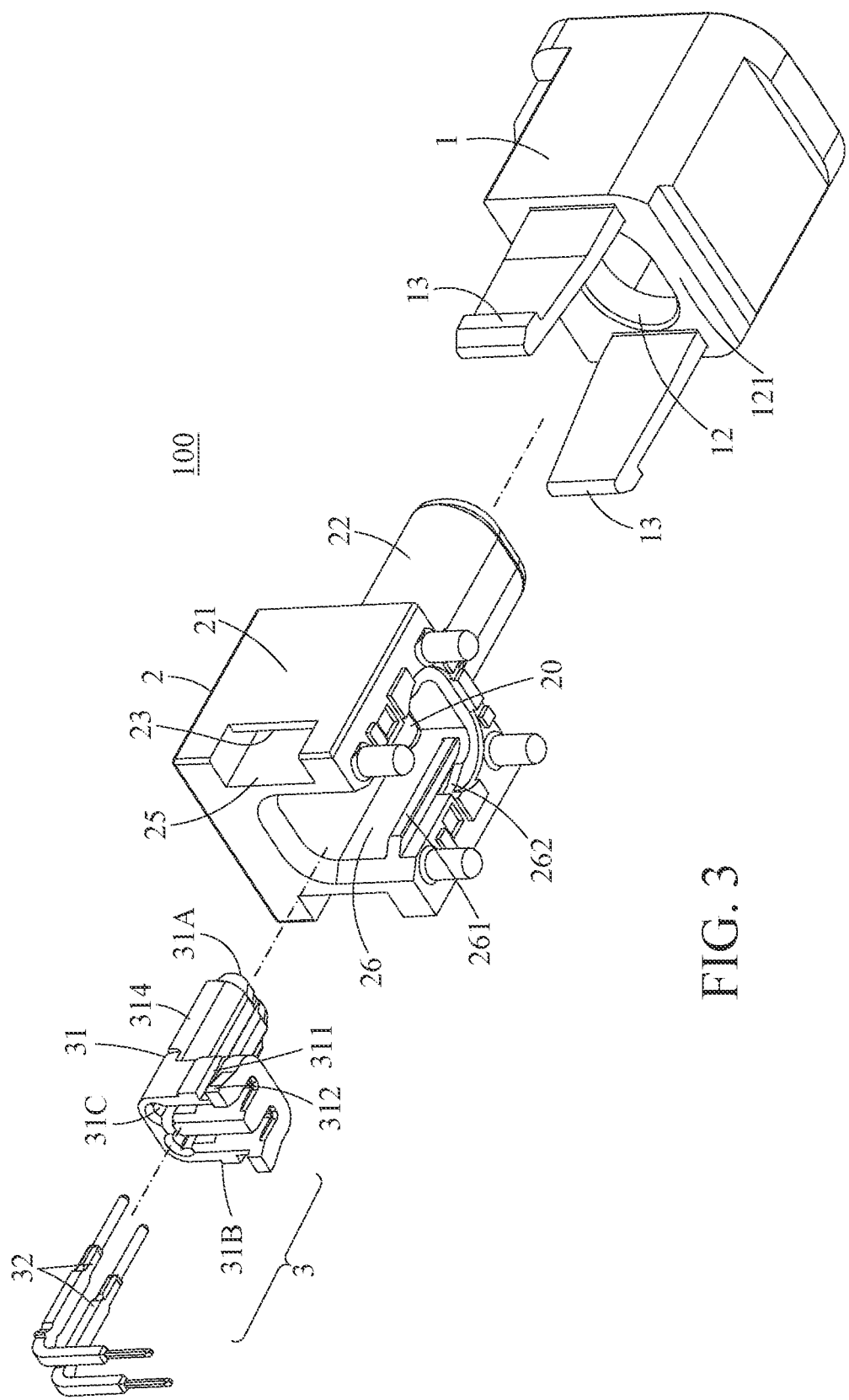
FIG. 3 illustrates a back exploded view of the automotive connector according to some embodiments of the instant disclosure.
Figure 5:
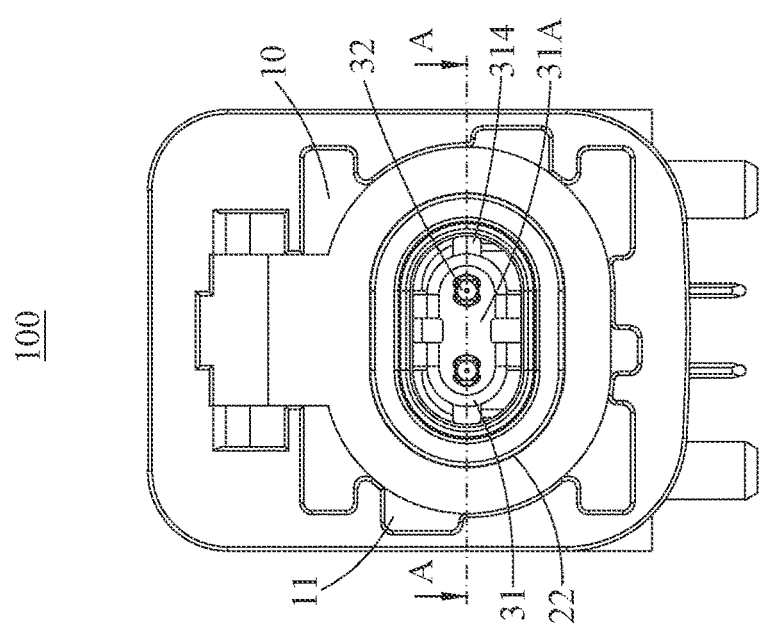
FIG. 5 illustrates a front view of the automotive connector according to some embodiments of the instant disclosure.

The outer shell 1 has a hollow receiving cavity 10. Two sides of the outer shell 1 have an insertion opening 11 and a mating opening 12 (as shown in FIG. 3 and FIG. 5) respectively in communication with the hollow receiving cavity 10. The outer shell 1 has a plurality of hooks 13, and each of the hooks 13 extends outwardly from a contact surface 121 at an outer side of the mating opening 12.

Figure 4:
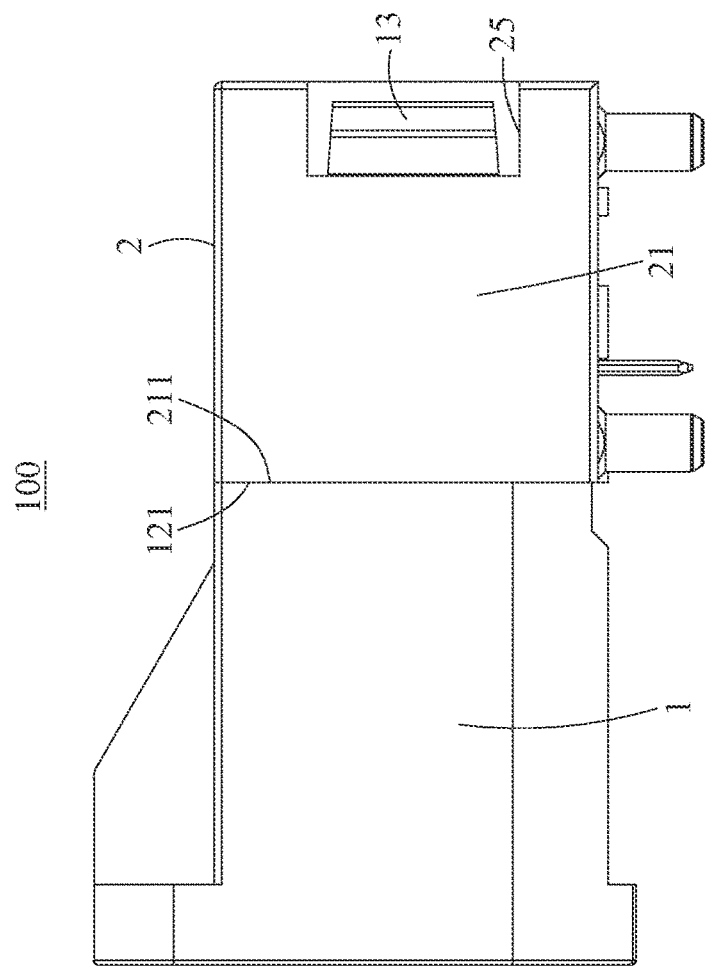
FIG. 4 illustrates a side view of the automotive connector according to some embodiments of the instant disclosure.

The inner shell 2 comprises a base 21 and a sleeve member 22 at a side portion of the base 21. The sleeve member 22 is fixed in the hollow receiving cavity 10 of the outer shell 1, and the base 21 has a mating surface 211 and two slots 23 at two sides of the mating surface 211. The mating surface 211 is attached to the contact surface 121 (as shown in FIG. 4), and each of the hooks 13 is engaged with a corresponding one of the slots 23 (as shown in FIG. 7).

The conductive assembly 3 comprises an insulated body 31 and a plurality of conductive members 32. The insulated body 31 is fitted over the conductive members 32, and the insulated body 31 is in the base 21 and the sleeve member 22 (as shown in FIG. 6).

Figure 6:
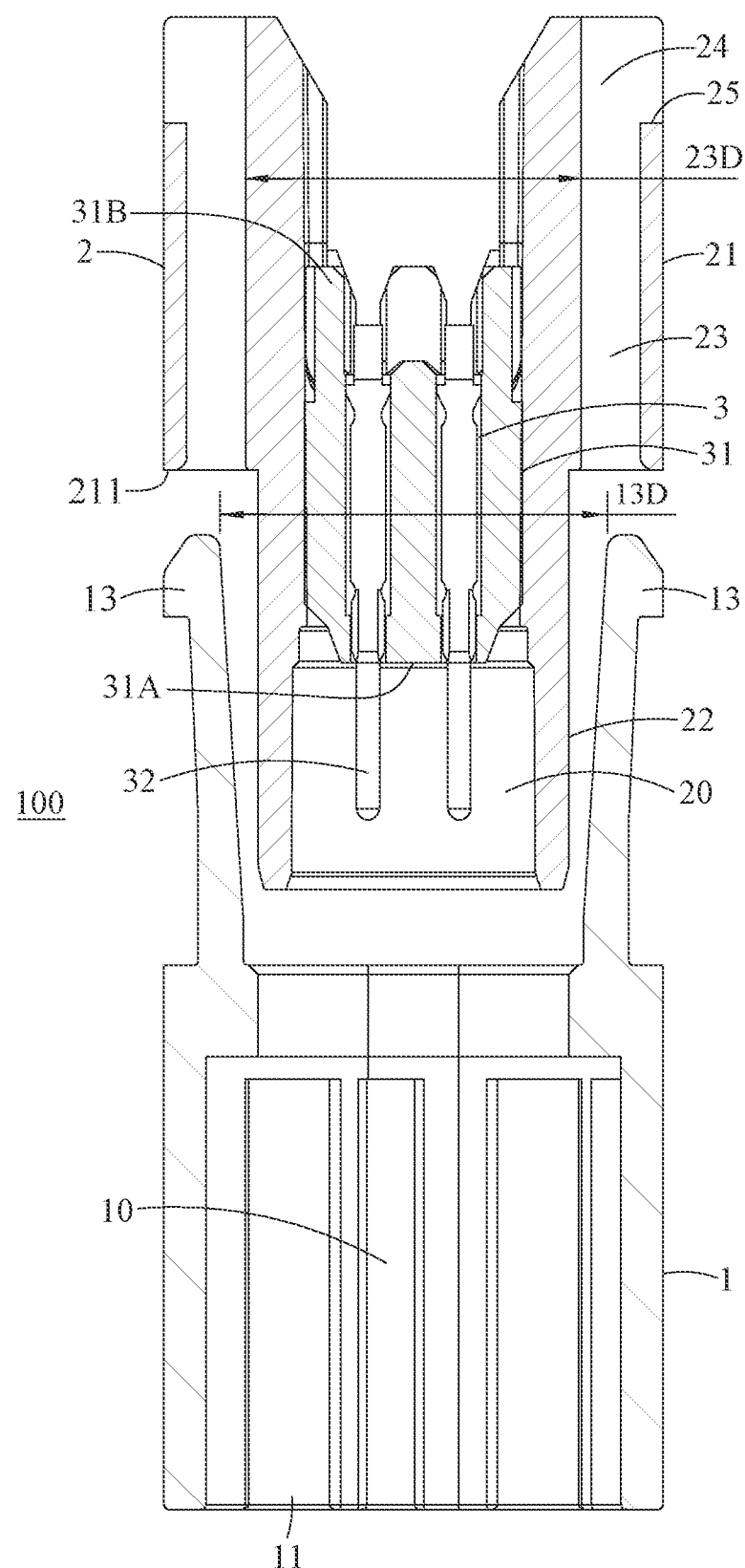
FIG. 6 illustrates a cross-sectional view along the line A-A shown in FIG. 5, where the outer shell and the inner shell are not assembled with each other yet.

In some embodiments, upon assembling the components of the automotive connector 100 with each other, first, the conductive members 32 are assembled with the insulated body 31 to form a semi-product, and then the insulated body 31 of the semi-product is inserted into the inner shell 2 (as shown in FIG. 6). Then, the sleeve member 22 of the inner shell 2 is aimed at and inserted into the mating opening 12 of the outer shell 1, so that the mating surface 211 of the base 21 of the inner shell 2 is attached to and positioned with the contact surface 121 of the outer shell 1 (as shown in FIG. 4). When the automotive connector 100 is mated with another electrical connector (for example, when the plug connector is mated with a receptacle connector), the outer shell 1 is not pushed against by the another electrical connector. Accordingly, in some embodiments, because the assembling between the outer shell 1 and the inner shell 2 is achieved by configuring the mating surface 211 to attach to and lean against the contact surface 121 in a large-surface contact manner, the mating surface 211 and the contact surface 211 can be properly supported by each other. Therefore, when another electrical connector is mated with the automotive connector 100 in an improper orientation (for example, when the another electrical connector is mated with the automotive connector 100 in a slanting orientation), the outer shell 1 and the inner shell 2 do not wobble with respect to each other. Hence, the connection stability between the automotive connector 100 and the another electrical connector is not affected.

Figure 7:
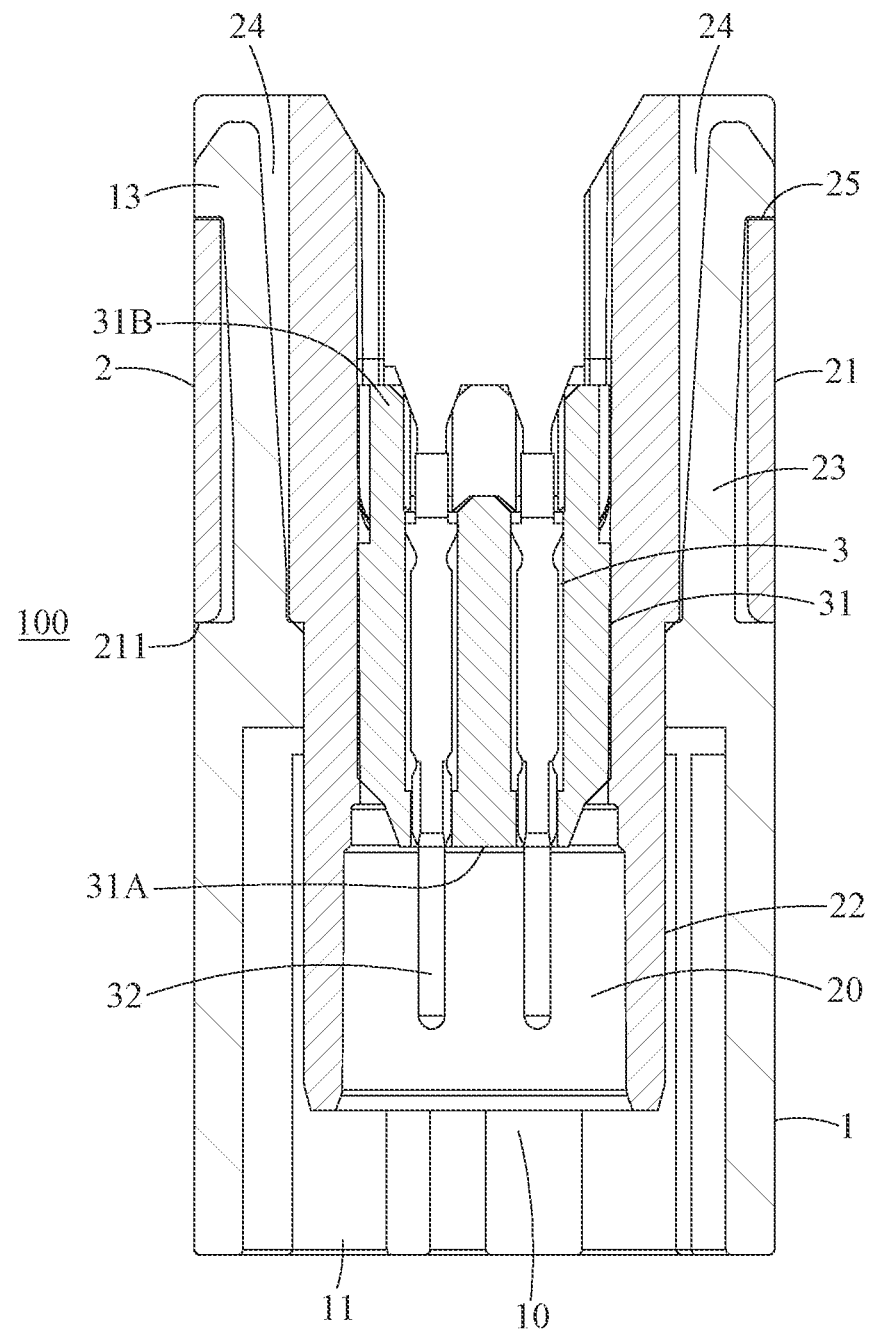
FIG. 7 illustrates a cross-sectional view along the line A-A shown in FIG. 5, where the outer shell and the inner shell are assembled with each other.

Please refer to FIG. 6 and FIG. 7. FIG. 6 illustrates a cross-sectional view showing a condition that the outer shell 1 and the inner shell 2 are not assembled with each other yet, and FIG. 7 illustrates a cross-sectional view showing a condition that the outer shell 1 and the inner shell 2 are assembled with each other. In some embodiments, upon assembling the outer shell 1 with the inner shell 2, each of the hooks 13 of the outer shell 1 is aimed at and inserted into a corresponding one of the slots 23 of the inner shell 2. Then, after each of the hooks 13 passes through the corresponding one of the slots 23, the hook 13 elastically bounces outward, so that the hooks 13 are closely engaged with engaging portions at two sides of the inner shell 2, thereby firmly positioning the outer shell 1 with the inner shell 2. Therefore, the hooks 13 are respectively engaged with the slots 23, so that the outer shell 1 can be assembled with and positioned with the inner shell 2.

In some embodiments, when the outer shell 1 of the automotive connector 100 is to be replaced by another outer shell 1 having a different configuration, the outer shell 1 can be detached from the inner shell 2 barehanded, without using other additional tools. The user just needs to detach the hooks 13 from the slots 23, so that the outer shell 1 can be detached from the inner shell 2. Next, another outer shell 1 having a different configuration is assembled with the inner shell 2, so that different outer shells 1 with different mating openings 11 can be provided to be assembled with the same inner shell 2 (for example, as shown in FIG. 5, the outer shell 1 has a first type mating opening which has a first inner diameter and a first shape, and the outer shell 1 shown in FIG. 5 can be replaced by an outer shell having a second type mating opening which has a second inner diameter and a second shape). Hence, by detaching the hooks 13 from the slots 23, the outer shell 1 of the automotive connector 100 can be replaced quickly, and thus the inventory of the outer shells 1 of the automotive connector 100 can be reduced.

Please refer to FIG. 6 and FIG. 7. In some embodiments, the base 21 has a plurality of spaces 24 and a plurality of openings 25. The openings 25 and the slots 23 are respectively at two sides of the base 21 and are in communication with each other. Each of the spaces 24 is at an inner side of a corresponding one of the openings 25, and each of the hooks 13 is movable in a corresponding one of the spaces 24, so that each of the hooks 13 is movably engaged with or detached from the inner side of the corresponding one of the openings 25. When the outer shell 1 is to be detached from the inner shell 2, the hooks 13 are pressed 13, so that the hooks 13 are moved to the spaces 24. Then, the outer shell 1 is separated from the inner shell 2, so that the hooks 13 can be separated from the slots 23.

Please refer to FIG. 2A and FIG. 3. In some embodiments, the inner shell 2 is manufactured by using die-casting techniques, and the inner shell 2 has a base 21 and a sleeve member 22 integrally formed as a one-piece member. The outer surface of the inner shell 2 is seamless. Therefore, the structural strength of the inner shell 2 is high, and the inner shell 2 is not deformed easily. Hence, the inner shell 2 can bear severe environmental changes.

Please refer to FIG. 2A. In some embodiments, an outer surface of the sleeve member 22 has a plurality of abutting portions 221, and the abutting portions 221 are engaged with an inner surface of the mating surface 12. The abutting portions 221 are at two sides of the outer surface of the sleeve member 22, and an extension direction of each of the abutting portions 221 is parallel to a central axial direction O of the sleeve member 22. Upon inserting the sleeve member 22 into the mating opening 12, since the extension direction of each of the abutting portions 221 and the insertion direction of the sleeve member 22 are the same, the abutting portions 221 continuously contact the inner surface of the mating opening 12, so that the sleeve member 22 is firmly positioned in the mating opening 12. In this embodiment, each of the abutting portions 221 is a barb structure symmetrically configured in a top-to-bottom direction. Upon assembling, the barb structure provides an interference force to eliminate the assembling tolerance between the outer shell 1 and the inner shell 2 effectively. Hence, the outer shell 1 and the inner shell 2 of the automotive connector 100 can be firmly assembled with each other without the occurrence of the wobbling issue. Therefore, the assembling quality of the automotive connector 100 can be enhanced.

Figure 2B:
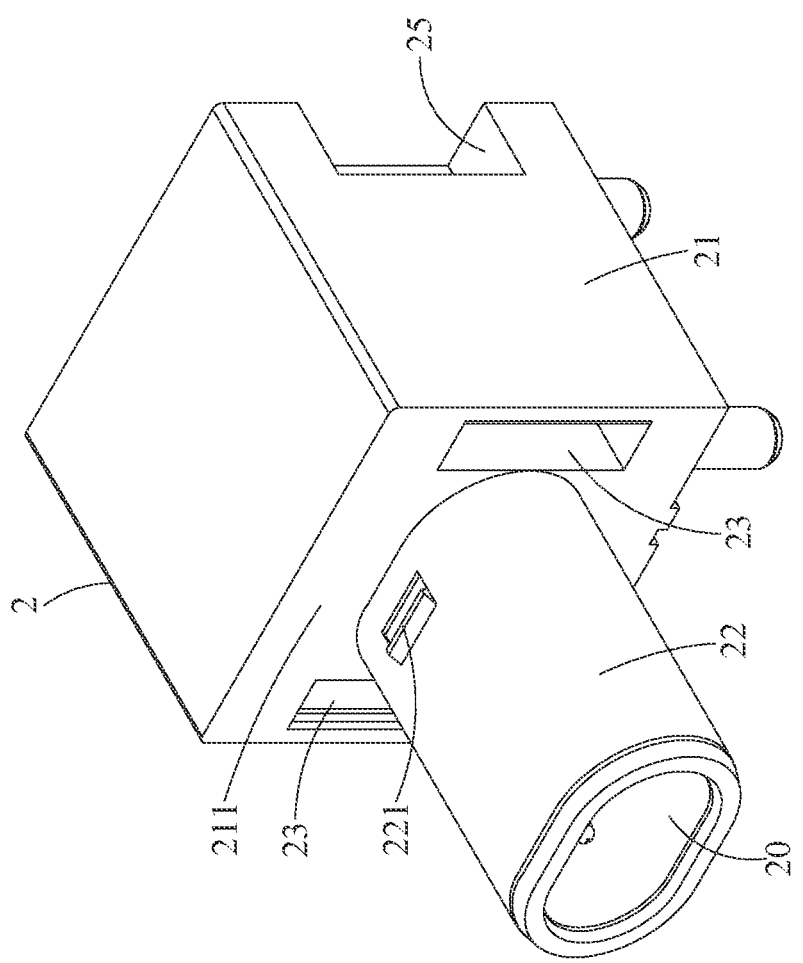
FIG. 2B illustrates a perspective view of another inner shell of the automotive connector according to some embodiments of the instant disclosure, where the extension direction of each of the abutting portions of the inner shell is perpendicular to the central axial direction of the sleeve member.

Please refer to FIG. 2B. In some embodiments, the abutting portions 221 are at two sides of the outer surface of the sleeve member 22, and the extension direction of each of the abutting portions 221 is perpendicular to the central axial direction O of the sleeve member 22. Upon inserting the sleeve member 22 into the mating opening 12, the abutting portions 221 closely contact the inner surface of the mating opening 12, so that the sleeve member 22 is firmly positioned in the mating opening 12.

Figure 8:
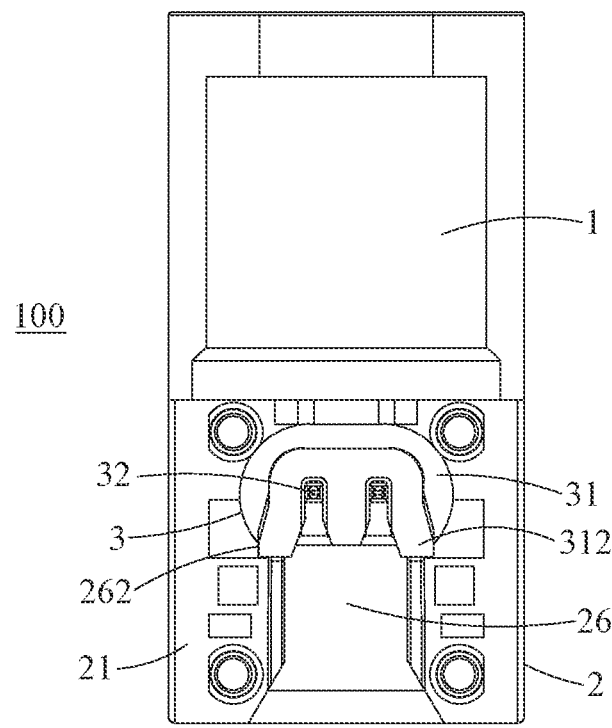
FIG. 8 illustrates a top view of the automotive connector according to some embodiments of the instant disclosure, where the limiting blocks are engaged with the limiting grooves.

Please refer to FIG. 3 and FIG. 8. FIG. 8 illustrates a top view of the automotive connector 100 according to some embodiments of the instant disclosure, where the limiting blocks 312 are engaged with the limiting grooves 262. In some embodiments, the base 21 has a recessed portion 26, and each of two sides of an inner portion of the recessed portion 26 has a slide block 261 (also referred to as the rail structure) and a limiting groove 262. The insulated body 31 is fixed in the recessed portion 26. Each of two sides of an outer portion of the insulated body 31 has a slide groove 311 and a limiting block 312. Each of the slide blocks 261 corresponds to a corresponding one of the slide grooves 311 and is slidable with respect to the corresponding one of the slide grooves 311, and each of the limiting blocks 262 corresponds to a corresponding one of the limiting grooves 262 and can be engaged with the corresponding one of the limiting grooves 262. When the insulated body 31 is assembled with the recessed portion 26, each of the slide blocks 261 slides to the inner side of a corresponding one of the slide grooves 311, and each of the limiting blocks 312 is engaged with a corresponding one of the limiting grooves 262, so that the insulated body 31 is fixed in the recessed portion 26, thereby limiting the three-dimensional movements of the insulated body 31 in the recessed portion 26.

Please refer to FIG. 3 and FIG. 8. In some embodiments, the recessed portion 26 of the inner shell 2 has rail structures (the slide blocks 261) with protruding elongated configurations. The rail structures (the slide blocks 261) facilitates the assembling between the insulated body 31 of the conductive assembly 3 and the inner shell 2. The configuration of the rail structure allows the inner shell 2 to be assembled with the insulated body 31 of the conductive assembly 3 more precisely. Furthermore, in some embodiments, the insulated body 31 holds the rail structures (the slide blocks 261) to increase the friction between the insulated body 31 and the inner shell 2. Therefore, in some embodiments, even if the automotive connector 100 is subjected to an external force and thus the inner shell 2 and the outer shell 1 are slightly wobbled with respect to each other, the inner shell 2 still can be firmly assembled with the insulated body 31 of the conductive assembly 3.

Figure 9:
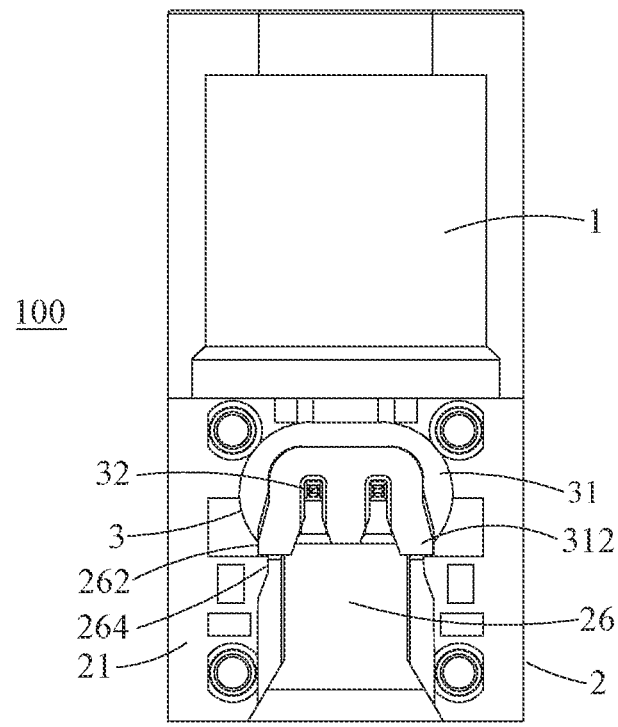
FIG. 9 illustrates a top view of the automotive connector according to some embodiments of the instant disclosure, where the limiting blocks are engaged with the limiting grooves and the stopping blocks.

Please refer to FIG. 9. FIG. 9 illustrates a top view of the automotive connector 100 according to some embodiments of the instant disclosure, where the limiting blocks 312 are engaged with the limiting grooves 262 and the stopping blocks 264. In some embodiments, each of the two sides of the inner portion of the recessed portion 26 has a stopping block 264, and each of the stopping blocks 264 leans against a corresponding one of the limiting blocks 312. Upon assembling the insulated body 31 with the recessed portion 26, each of the limiting blocks 312 slides into a corresponding one of the limiting grooves 262 along the guiding surface of a corresponding one of the stopping blocks 264. When each of the limiting blocks 312 is engaged with the corresponding one of the limiting grooves 262, a side portion of each of the limiting blocks 312 is engaged and positioned with the corresponding one of the stopping blocks 264, so that the insulated body 31 is fixed in the recessed portion 26, thereby limiting the three-dimensional movements of the insulated body 31 in the recessed portion 26.

Please refer to FIG. 2A and FIG. 3. In some embodiments, the insulated body 31 has a connector head 31A and a fixation mount 31B, the connector head 31A extends outwardly from the fixation mount 31B, and the connector head 31A and the fixation mount 31B are substantially together of an L-shaped structure. The slide grooves 311 and the limiting blocks 312 are respectively at two sides of the fixation mount 31B. The insulated body 31 has a plurality penetration holes 31C (as shown in FIG. 3) defined through the connector head 31A and the fixation mount 31B. The conductive members 32 pass through the connector head 31A and the fixation mount 31B, and each of the conductive members 32 is substantially of an L-shaped structure.

Please refer to FIG. 2A and FIG. 3. In some embodiments, an outer periphery of the connector head 31A has a plurality of protruding ribs 314. The inner shell 2 has a through hole 20, and the protruding ribs 314 lean against an inner surface of the through hole 20.

Please refer to FIG. 2A and FIG. 3. In some embodiments, each of the hooks 13 is an elastic arm, and each of the hooks 13 extends outwardly from the contact surface 121 at the outer side of the mating opening 12. The hooks 13 extend obliquely with respect to each other, so that a distance between head portions of the hooks 13 is less than a distance 13D between end portions of the hooks 13. The hooks 13 are configured slantly. The distance 13D between the end portions of the hooks 13 is greater than a spacing 23D of the slots 23 (as shown in FIG. 6).

As above, according to some embodiments of the instant disclosure, the hooks of the outer shell can be detached from the slots of the inner shell barehanded, so that the outer shell can be detached from the inner shell. Then, another outer shell can be assembled with the inner shell, so that outer shells with different insertion openings can be assembled with the same inner shell conveniently. Therefore, the outer shell of the automotive connector can be replaced quickly, and thus the inventory of the outer shells of the automotive connector can be reduced. Moreover, in some embodiments, because the assembling between the outer shell and the inner shell is achieved by configuring the mating surface to attach to and lean against the contact surface in a large-surface contact manner, the mating surface and the contact surface can be properly supported by each other. Therefore, when the automotive connector is mated with another electrical connector in an improper orientation, the outer shell and the inner shell do not wobble with respect to each other. Hence, the connection stability between the automotive connector and the another electrical connector is not affected.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An automotive connector, comprising:
an outer shell having a hollow receiving cavity, wherein two sides of the outer shell have an insertion opening and a mating opening respectively in communication with the hollow receiving cavity, the outer shell has a plurality of hooks, and each of the hooks extends outwardly from a contact surface at an outer side of the mating opening;
an inner shell comprising a base and a sleeve member at a side portion of the base, wherein the sleeve member is fixed in the hollow receiving cavity of the outer shell, the base has a mating surface and two slots at two sides of the mating surface, the mating surface is attached to the contact surface, and each of the hooks is engaged with a corresponding one of the slots; and
a conductive assembly comprising an insulated body and a plurality of conductive members, wherein the insulated body is fitted over the conductive members, and the insulated body is in the base and the sleeve member.

2. The automotive connector according to claim 1, wherein the base has a plurality of spaces and a plurality of openings, the openings and the slots are respectively at two sides of the base and are in communication with each other, each of the spaces is at the inner side of a corresponding one of the openings, and each of the hooks is movable in a corresponding one of the spaces, so that each of the hooks is movably engaged with or detached from the inner side of the corresponding one of the openings.

3. The automotive connector according to claim 2, wherein an outer surface of the sleeve member has a plurality of abutting portions, and the abutting portions are engaged with an inner surface of the mating opening.

4. The automotive connector according to claim 3, wherein the abutting portions are at two sides of the outer surface of the sleeve member, and an extension direction of each of the abutting portions is parallel to a central axial direction of the sleeve member.

5. The automotive connector according to claim 1, wherein the abutting portions are at two sides of the outer surface of the sleeve member, and an extension direction of each of the abutting portions is perpendicular to a central axial direction of the sleeve member.

6. The automotive connector according to claim 2, wherein the base has a recessed portion, each of two sides of an inner portion of the recessed portion has a slide block and a limiting groove, the insulated body is fixed in the recessed portion, each of two sides of an outer portion of the insulated body has a slide groove and a limiting block, each of the slide blocks corresponds to a corresponding one of the slide grooves, and each of the limiting blocks corresponds to a corresponding one of the limiting grooves.

7. The automotive connector according to claim 6, wherein each of the two sides of the inner portion of the recessed portion has a stopping block, and each of the stopping blocks leans against a corresponding one of the limiting blocks.

8. The automotive connector according to claim 6, wherein the insulated body has a connector head and a fixation mount, the connector head extends outwardly from the fixation mount, the slide grooves and the limiting blocks are respectively at two sides of the fixation mount, the insulated body has a plurality of penetration holes defined through the connector head and the fixation mount, and the conductive members pass through the connector head and the fixation mount.

9. The automotive connector according to claim 8, wherein an outer periphery of the connector head has a plurality of protruding ribs, the inner shell has a through hole, and the protruding ribs lean against an inner surface of the through hole.

10. The automotive connector according to claim 1, wherein the hooks extend obliquely with respect to each other, so that a distance between head portions of the hooks is less than a distance between end portions of the hooks, and the distance between the end portions of the hooks is greater than a spacing between the slots.

* * * * *